United States Patent [19]

Ayer et al.

[11] Patent Number: 5,071,607
[45] Date of Patent: Dec. 10, 1991

[54] METHOD AND APPARATUS FOR FORMING A HOLE IN A DRUG DISPENSING DEVICE

[75] Inventors: Atul D. Ayer; Hans H. Balkie, both of Mountain View, Calif.

[73] Assignee: Alza Corporation, Palo Alto, Calif.

[21] Appl. No.: 473,249

[22] Filed: Jan. 31, 1990

[51] Int. Cl.$^5$ .................. B29C 43/04; B29C 43/18
[52] U.S. Cl. ..................................... 264/112; 264/113; 264/266; 264/293; 425/344; 425/345; 425/352; 425/353; 425/354; 425/385; 604/892.1
[58] Field of Search ............... 264/138, 154, 155, 156, 264/112, 113, 293, 297.1, 297.6, 266; 425/289, 352, 353, 354, 385, 344, 345; 604/890.1, 892.1

[56] References Cited

U.S. PATENT DOCUMENTS

| | | | |
|---|---|---|---|
| 1,319,075 | 10/1919 | Hemstreet | 425/352 |
| 1,609,460 | 1/1925 | Buttles | 425/352 |
| 2,122,874 | 1/1935 | Whipple | 425/352 |
| 2,135,803 | 11/1938 | Dumert | 425/352 |
| 2,798,255 | 7/1957 | Winters | 425/128 |
| 3,096,248 | 7/1963 | Rudzki | 264/112 |
| 3,146,169 | 6/1962 | Stephenson et al. | 424/467 |
| 3,177,077 | 4/1965 | Eyraud et al. | 425/352 |
| 3,342,915 | 2/1965 | Wanderer | 425/310 |
| 3,845,770 | 11/1974 | Theeuwes et al. | |
| 3,916,899 | 11/1975 | Theeuwes et al. | |
| 4,000,231 | 12/1976 | Peterson | 264/40.2 |
| 4,088,864 | 5/1978 | Theeuwes et al. | |
| 4,230,653 | 10/1980 | DeSantis | 264/109 |
| 4,271,113 | 6/1981 | Luschen | 264/119 |
| 4,302,412 | 11/1981 | DeSantis | 264/109 |
| 4,576,604 | 3/1986 | Guittard et al. | 604/890.1 |
| 4,601,866 | 7/1986 | David et al. | 264/109 |
| 4,618,487 | 10/1986 | DuBois et al. | 514/474 |
| 4,673,405 | 6/1987 | Guittard et al. | 604/890.1 |
| 4,842,867 | 6/1989 | Ayer et al. | 604/892.1 |
| 4,851,228 | 7/1989 | Zentner et al. | 604/890.1 |

FOREIGN PATENT DOCUMENTS

| | | |
|---|---|---|
| 275392 | 6/1914 | Fed. Rep. of Germany . |
| 360115 | 9/1922 | Fed. Rep. of Germany . |
| 471067 | 10/1914 | France .............. 425/345 |
| 55-135615 | 4/1979 | Japan . |
| 755607 | 12/1972 | U.S.S.R. . |
| 1122520 | 4/1983 | U.S.S.R. . |

*Primary Examiner*—Mary Lynn Theisen
*Attorney, Agent, or Firm*—Steven F. Stone; Edward L. Mandell; Paul L. Sabatine

[57] ABSTRACT

A press is provided for simultaneously pressing and piercing an object. The piercing means moves from a sheathed to unsheathed position in response to compressive pressure. The piercing means are normally biased in the sheathed position by a bias means. Methods and apparatus for piercing an object are disclosed. The press can be used to produce a pierced dispensing device having a compression coating by (a) charging to a die mold a quantity of powder to be compressed; (b) delivering to the die mold an unpierced dispensing device core; (c) charging to the die mold an additional quantity of powder to be compressed; and (d) substantially simultaneously (i) compressing the elements within the die mold to produce a compression coating, and (ii) piercing the compression coating. The compression coating can comprise, for example, a loading dose or a semipermeable membrane.

17 Claims, 4 Drawing Sheets

METHOD AND APPARATUS FOR FORMING A HOLE IN A DRUG DISPENSING DEVICE

TECHNICAL FIELD

The invention herein pertains to a device and process for forming one or more outlet passageways in a dispensing device. In a preferred embodiment it relates to a high speed process for forming such passageways through the semipermeable wall of an osmotic device by mechanical means. An especially preferred method uses a pressure actuated spring biased retracting needle member to create the passageway. In one embodiment, a pressure coating such as a loading dose is adhered to an osmotic core in conjunction with the piercing of the compression coating and osmotic core.

BACKGROUND ART

U.S. Pat. No. 3,146,169 pertains to the formation of an inert coating which surrounds an active agent to be dispensed from a tablet. A hole is mechanically punched in the inert coating for release of the active agent.

U.S. Pat. No. 4,271,113 shows the production of an osmotic device, which includes an exit passageway in a semipermeable coating, by pressing a depression into the core member, at least a portion of which remains as a hole in the coating after the semipermeable coating is sprayed onto the core. U.S. Pat. No. 3,916,899 generally suggests the use of drilling, punching, laser drilling, or casting methods to produce a passageway in an osmotic device.

U.S. Pat. No. 4,302,412 shows a method for compacting powder material into a pressed article. U.S. Pat. No. 4,601,866 shows a method for compacting powder material into a pressed article at controlled temperatures.

U.S. Pat. No. 4,088,864 shows the use of a laser to produce passageways in an osmotic device.

Although the devices of the prior art can be used to form holes in tablets and dispensing devices, it would be desirable to operate at higher production rates than presently obtained. Also laser drills are quite expensive compared to mechanical punches, and their speed is limited by the cycle time of the laser. When prior art mechanical punches were operated at high speeds the tablets tended to hang up on the punch point.

It is therefore an object of the present invention to provide a method and apparatus for producing a passageway in a dispensing device, such as an osmotic dosage form, which is inexpensive and capable of operating at high speeds.

It is another object of the invention to provide a passageway-producing method which is useful for tablets having round, oval, oblong, or other shapes.

It is yet another object of the invention to provide a method of producing an osmotic device having a pierced compression coating.

It is another object of the invention to provide a pressure-actuated piercing mechanism for producing a pierced dispensing device.

It is yet another object of the invention to provide a piercing means which retracts the piercing point from the interior of the pierced object, and thus frees the object from the piercing means.

These and other objects of the invention will be apparent to one skilled in the art in view of the disclosure and claims herein.

BRIEF DESCRIPTION OF THE INVENTION

Methods and apparatus for producing a pierced object, such as an osmotic drug dispensing device, are given. In one embodiment, methods and apparatus for simultaneously producing a compression coating, such as a loading dose or a compression coated semipermeable membrane, on an object and piercing the object are given. The object is pierced using a piercing means which is biased in a sheathed position and is unsheathed upon application of a compressive force.

A method for producing a pierced dispensing device having a compression coating comprises (a) charging to a die mold a quantity of coating powder to be compressed; (b) delivering to the die mold an unpierced dispensing device core; (c) charging to the die mold an additional quantity of coating powder to be compressed; (d) substantially simultaneously (i) compressing the elements within the die mold to produce a compression coating, (ii) unsheathing a sheathed piercing means and (iii) piercing the compression coating and the dispensing device core with the unsheathed piercing means.

A pressure actuated piercing device comprises a means for retaining an object to be pierced, and a pressure actuated means for piercing the object, wherein the means for piercing the object is in sheathed position in the absence of pressure actuation, and is in piercing relation to the object with pressure actuation.

BRIEF DESCRIPTION OF DRAWINGS

FIG. 1 shows the station after it has been charged and prior to the compression stroke.

FIG. 2 shows the station during the compression stroke.

FIG. 3 shows the station during the discharge stroke.

DISCLOSURE OF INVENTION INCLUDING BEST MODE

Devices and methods of this invention can be used for piercing an object such as a dispensing device, typically a drug dosage form, such an osmotic pump.

Typically the dosage form would be configured as a tablet or lozenge and would be designed for the delivery of one or more drugs to a biological environment. Typical osmotic devices are disclosed, for example in U.S. Pat. Nos. 3,845,770, 3,916,899, 4,111,202, 4,327,725, 4,595,583 and U.S. Pat. No. 4,800,056, the disclosures of which are incorporated herein by reference in their entireties.

The type of drug to be delivered is not material to this invention, but as used herein the term "drug" broadly includes any biologically, physiologically or pharmacologically active agent. The term generically includes for example, gastrointestinal, cardiovascular, respiratory, neoplastic, antibiotic, cholinomimetic, skeletal muscle relaxant, diuretic, uterine, hormonal, anesthetic, sedative, hypnotic, antiepileptic, psychopharmacologic, analgesic, antipyretic, antifungal, antihistaminic, central nervous system active, parasiticidic, and diagnostic agents, as well as nutrients, vitamins, minerals, biocides and antiseptics.

The pierced dispensing device can include one or more coatings or layers. Such layers can be applied as a spray coating prior to or subsequent to the piercing of the device. Alternatively, such layers can be applied as a compression coating contemporaneously with the piercing of the device.

The piercing devices and methods of this invention can be used in conjunction with conventional reciprocating or rotary tableting machines, pharmaceutical presses for the manufacture of compression coatings, or with printing presses which are used to impress a pattern, name, or other information onto the surface of a tablet or capsule. Such presses are standard devices, such as the Kilian RUD-V 20 (Kilian & Co., Koln, West Germany), or can be specially designed and manufactured. A representative cam operated tablet press is described in U.S. Pat. No. 4,601,866, the disclosure of which is incorporated herein by reference.

Figure 1:
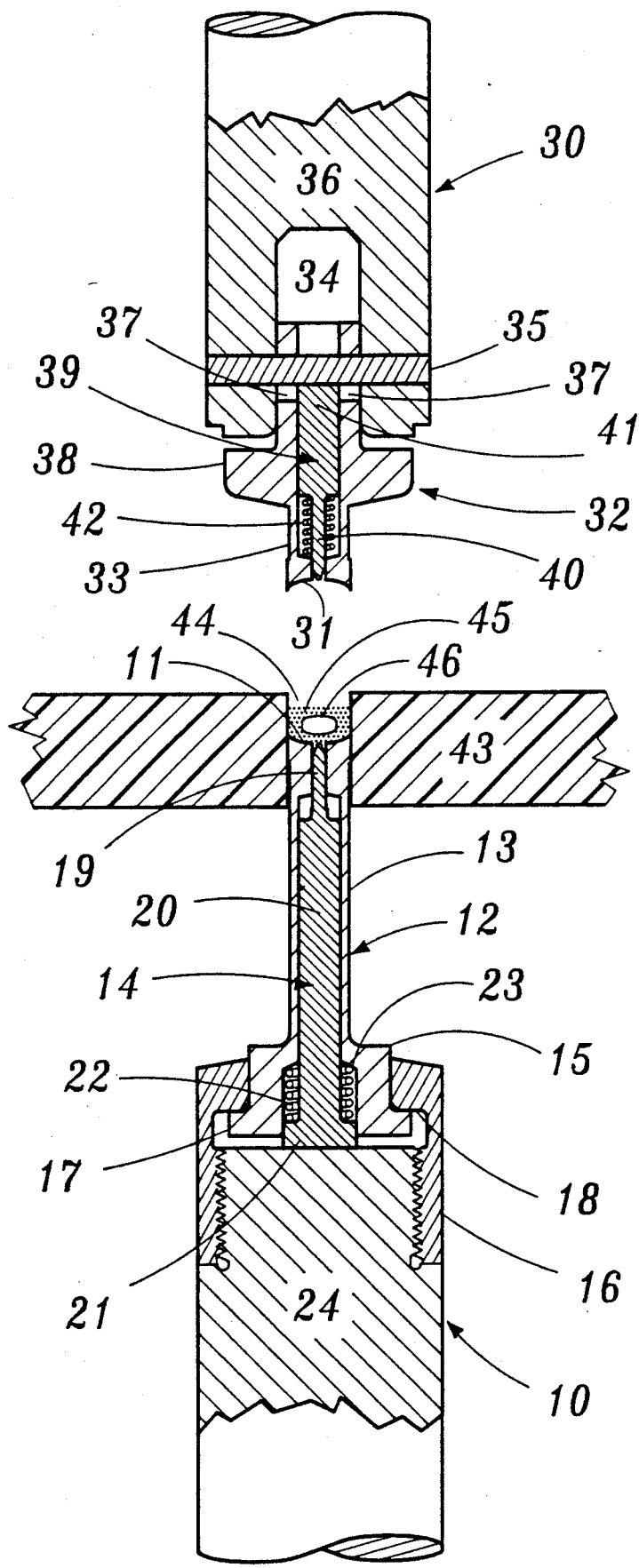
FIGS. 1 through 3 are sequential cross-sectional drawings through a station of a rotary tablet press utilizing the retractable piercing device of this invention.

Referring now to FIG. 1, lower ram assembly 10 comprises a lower die element 12 having a face portion 11 of the desired configuration, a hollow tubular portion 13 adapted to slidably receive lower piercing means 14, a collar 15 portion adapted to be slidably received in cap 16 and an annular flange 17 adapted to abut internal shoulder 18 formed in cap 16. Cap 16 is threadably connected to lower ram 24.

Lower piercing means 14 comprises a punch portion 19, mounted in a bore extending through die face 11, and a cylindrical body portion 20 terminating in an annular flange portion 21. Bias means 22 in the form of a compression spring is located around the body portion 20 between flange 21 and shoulder 23 formed within lower die element 12. Thus piercing means 14 and die element 12 are capable of relative reciprocal motion. The piercing means when 14 is biased in the retracted or sheathed position within face portion 11 when the lower die element 12 is uncompressed, i.e., spaced apart from the upper face of ram 24.

Upper ram assembly 30, includes an upper die element 32, having a face portion 31, of the desired configuration and a hollow body portion 33 provided with an annular flange 38 The upper end of die element 32 is slidably received within a cavity 34 in the lower end of upper ram 36 and slidably maintained thereon by means of pin 35 extending through ram 36 and opposed slots 37 in die element 32. Upper piercing means 39 is slidably mounted within the hollow portion of upper die element 32, and maintained in fixed relation to upper ram 36 by means of pin 35, thereby allowing die element 32 to reciprocate with respect to piercing means 39 and upon upper ram 36.

Piercing means 39 comprises a punch portion 40 and a cylindrical body portion 41 the juncture of which forms a shoulder against which bias means 42, in the form of a compression spring, abuts. Bias means 42 surrounds punch 40 and biases punch 40 in its retracted or sheathed position within upper die element 32.

A die plate 43 is provided with an orifice 44 into which upper and lower die elements 12 and 32 are slidably received and the walls of which, in cooperation with die faces 31 and 11 form the mold which defines the configuration of the end product. As shown in FIG. 1 the mold has been charged with the object to be pierced. In this case, discretes units of powdered coating material 45, osmotic core tablet 46, and additional powdered coating material 45 have been charged to the mold by means of conventional feed tubes and transfer plates which form no part of this invention and which have been omitted for clarity. As shown, a compression coating is to be formed with the piercing of the object. The compression coating can comprise, for example, a semipermeable membrane, a loading dose, a physical or chemical protective layer, and the like. The configuration of the mold may take any desired configuration, either symmetrical or asymmetrical, by appropriate choice of the configuration of the die faces 31 and 11 and orifice 44.

Figure 2:
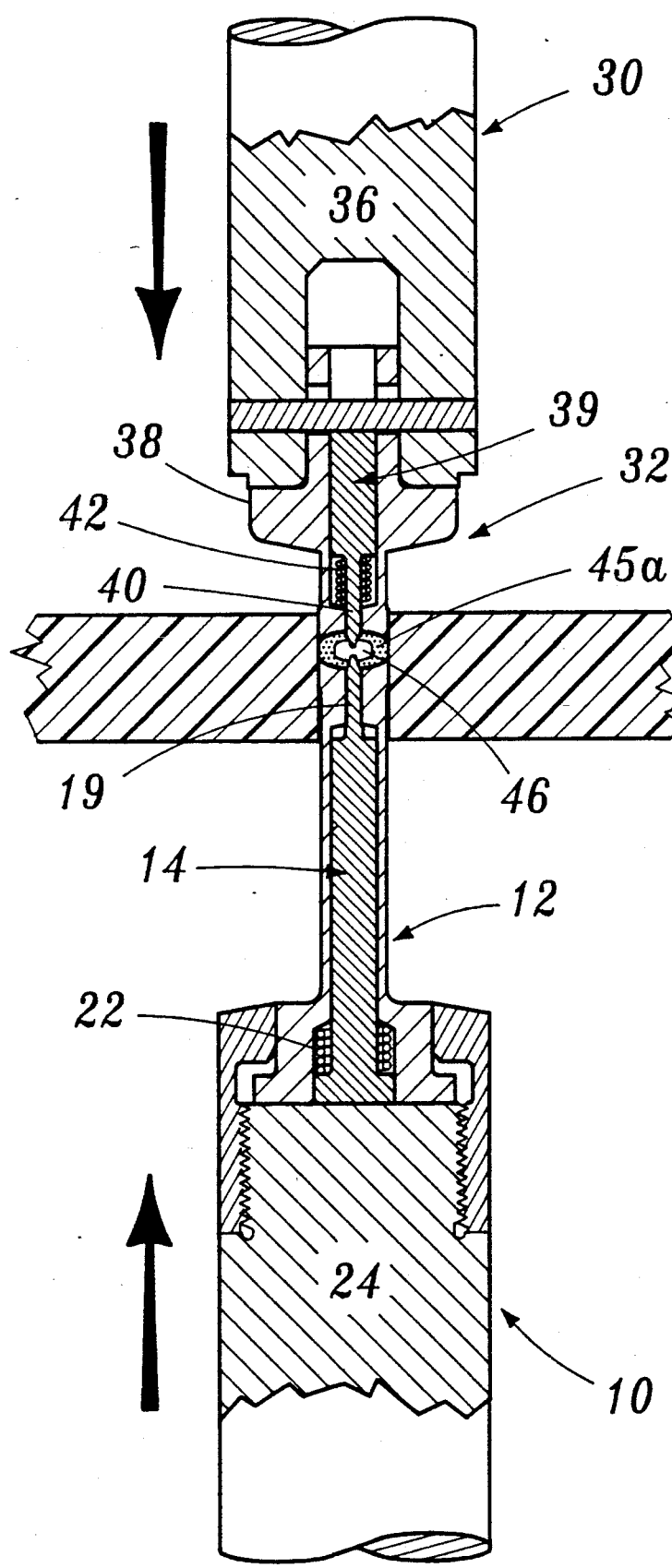

Referring now to FIG. 2, the station of FIG. 1 is shown during the compression phase of the press cycle after upper ram assembly 30 has been driven downward onto the lower ram assembly 10. The compressible powder 45 of FIG. 1 within the mold has formed a compression coating 45a around the core 46. Lower die element 12 has been forced against the upper face of lower ram 24 thereby further compressing bias means 22. Lower die element 12 has moved longitudinally with respect to lower piercing means 14 thereby unsheathing punch 19 causing it to extend into the core 46 and into the coating 45a, formed during the compression stroke from powder 45 of FIG. 1.

Similarly, the flange 38 on upper die element 32 has been forced into contact with the lower face of upper ram 36, thereby further compressing bias means 42. Upper die element 32 has moved longitudinally with respect to upper piercing means 39 thereby unsheathing punch 40 causing it to also extend into the coating 45a and core 46. Thus the core 46 is coated with semipermeable membrane and is pierced substantially simultaneously by the force exerted between rams 10 and 30 during the compression stroke.

The depth of the hole formed by the punch is equal to the length of the punches exposed at the peak of the compression stroke and is established by the length of the punches and the depth of the gaps existing between the die element 12 and 32 and the rams 24 and 36, respectively, when each die element and ram is biased apart as shown in FIG. 1. When the compression force is relieved, bias means 22 and 42 cause the die elements 12 and 32 to return to the position shown in FIG. 1 with the punches once again sheathed. When an osmotic dispensing device is to be pierced, the piercing means is adapted to pierce or puncture the semipermeable membrane and any coating layers which are external to the semipermeable membrane. The inner core of the osmotic device may also be punctured to a greater or lesser degree.

Figure 3:
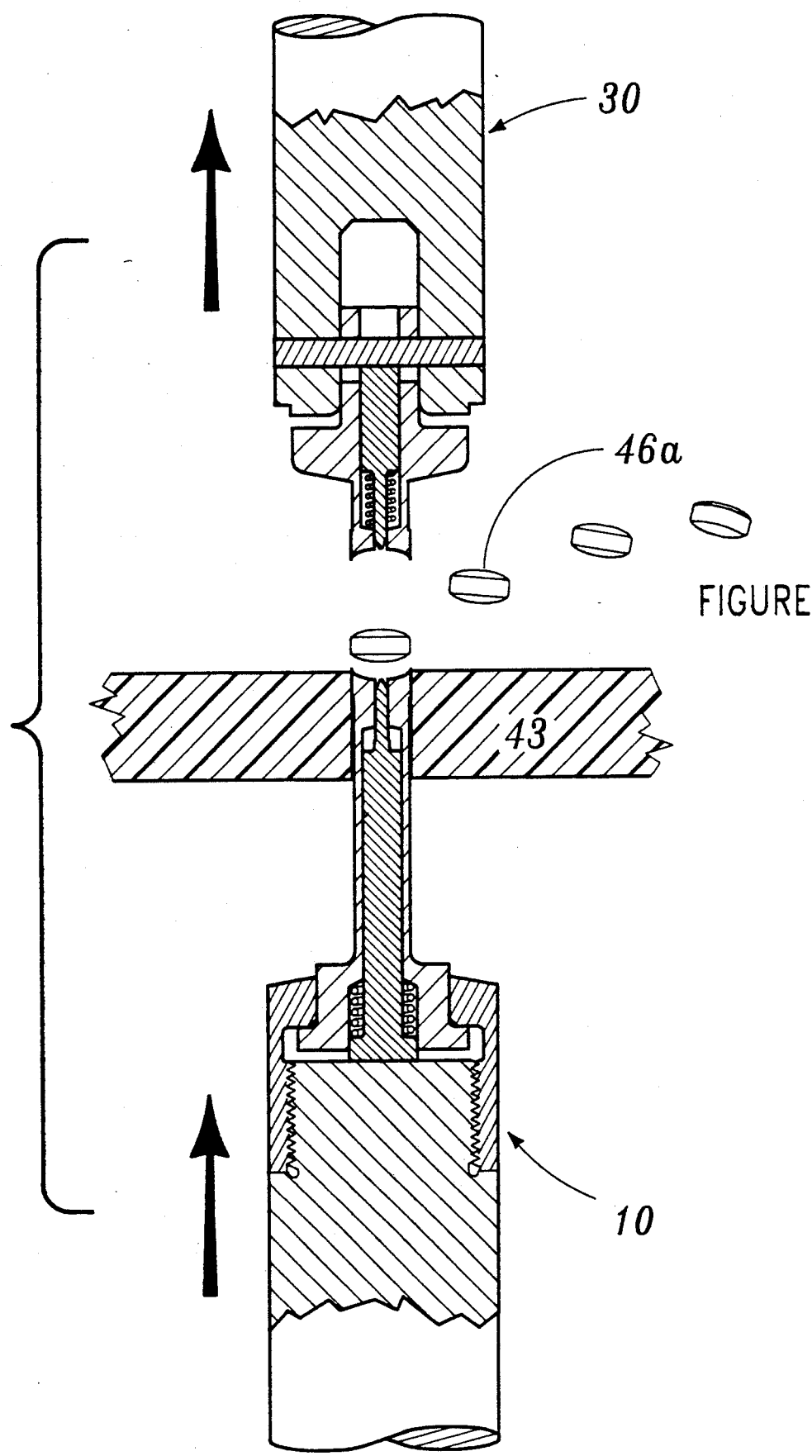

Referring now to FIG. 3, once the coating has been formed and pierced, the discharge stroke occurs with upper ram assembly 30 being driven out of die plate 43 and lower ram assembly 10 moving upwardly to push coated tablet 46a out of the mold cavity. The sheathing of the punches removes their points from the interior of the tablet 46a.

FIGS. 1-3 show the cycle for a single station, it being recognized that typical tablet presses are provided with multiple stations whereby processing rates in the order of 40-80,000 tablets/hour can be obtained.

As shown in FIG. 3, one hole is punched into each of the upper and the lower faces of the object per cycle, which yields a dispensing device having two exit passageways. It is easily seen that modifications are possible to provide a dispensing device with only one exit passageway by using only one punch and only punching one face of the object. A plurality of holes can be punched in either face of the object by using punches with multiple points.

Figure 5:
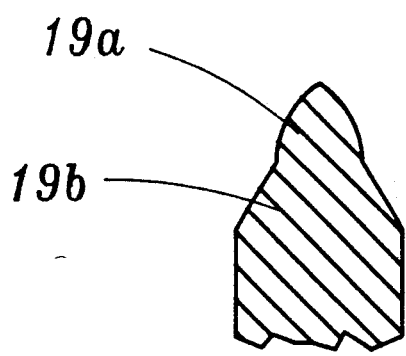
FIG. 5 shows an enlarged view of the tip of the piercing means of FIG. 4.
Figure 4:
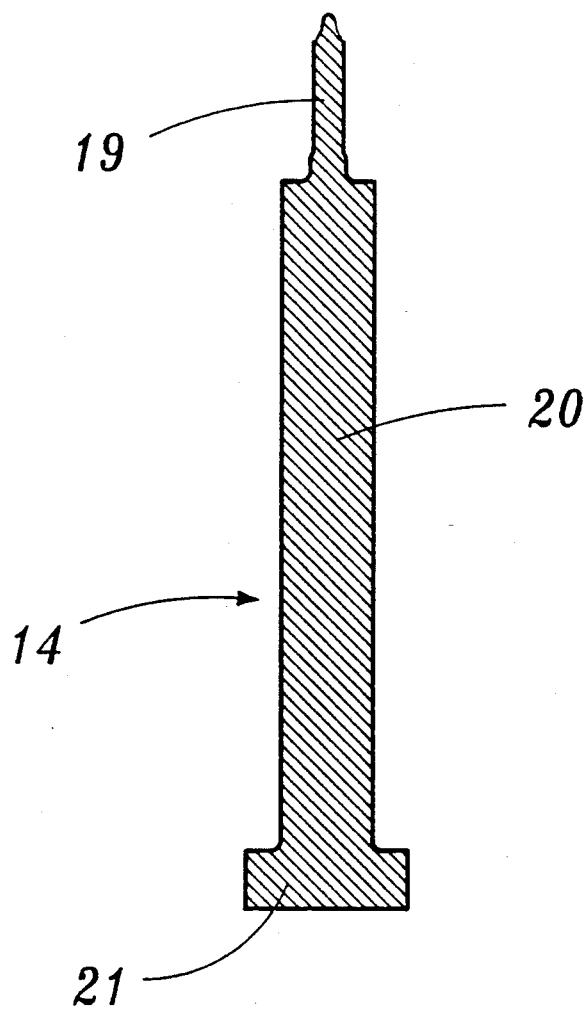
FIG. 4 shows a preferred embodiment of a piercing means.

FIG. 4 is a view of the lower piercing means 14. The piercing means 14 includes a punch tip 19, a cylindrical body portion 20, and an annular flange 21. The piercing end of the punch portion has been enlarged to show detail in FIG. 5. The pointed end is adapted to pierce the unpierced object. The point can comprise, for example, a needle, cone, pyramid, and the like. In the preferred embodiment shown in FIG. 5, the punch portion comprises a pointed dome 19a and a conical section 19b. The preferred punch tip 19, as shown, provides industrial durability and acts to pierce the dispensing device without fracturing or cracking the compression coating or other layers which are present.

While the moveable press assemblies herein are described as "lower" and "upper", the invention is useable in other spatial configurations such as horizontal or rotary, for example. Such minor modifications are well within the skill of those knowledgeable in the art.

It is clear that although the apparatus and methods have been described with respect to the provision of a compression coating and the simultaneous piercing of an unpierced dispensing device, other modifications are possible and well within the scope and knowledge of the art. The apparatus and methods are equally applicable to a procedure in which no compression coating is applied. Piercing can also be accomplished when a design or logo is to be printed onto the device. In such a case, the unpierced dispensing device is charged to the printing/piercing apparatus, imprinting pressure is applied, and piercing of the device takes place.

Modifications of the above described process and apparatus will be apparent to those skilled in the mechanical and/or pill handling arts. Such modifications are intended to be within the spirit and scope of the following claims.

We claim:

1. A method for piercing an object, comprising:
   (a) charging into a die member an object to be pierces, said die member comprising a die face and piercing means within said die member moveable from a sheathed position with the piercing end of said piercing means behind said die face, to an unsheathed position with the piercing end of said piercing means extended through said die face, said piercing means being biased in said sheathed position in the absence of a compressive force on said die face;
   (b) compressing said object to be pierced in said die member; and
   (c) simultaneously with the compression of said object, and in response thereto, moving said piercing means relative to said die face from the sheathed to the unsheathed position to produce an object pierced to a predetermined depth.

2. A method according to claim 1 further comprising the steps of:
   (d) relieving the compression of said pierced object;
   (e) simultaneously with said relief of compression, and in response thereto, moving said piercing means relative to said die face from said unsheathed to said sheathed position; and
   (f) removing said pierced object from said die member.

3. A method according to claim 2 wherein the object to be pierced is an somatic dispensing device.

4. A method according to claim 1 the steps of:
   (a) wherein the object to be pierced comprises a core component and a quantity of coating powder to be compressed; whereby substantially simultaneously with compression of the elements within the die member a pierced compression coated object is produced.

5. A method according to claim 4 wherein the object to be pierced is an osmotic dispensing device.

6. A method according to claim 4 wherein the compression of the coating powder forms a semipermeable membrane.

7. An improved press device for piercing an object, said device exhibiting a loading phase, a compression phase, and a discharge phase, the improvement comprising a piercing means which is spring biased in a sheathed position during the loading phase and discharge phase, and is in unsheathed piercing position during the compression phase.

8. An improved press device according to claim 7 wherein the object to be pierced is an osmotic dispensing device.

9. A pressure actuated device for piercing an object, comprising:
   (a) a die member having a face for contacting said object;
   (b) means for applying a compressive force between said face and said object;
   (c) piercing means within said die member moveable from a sheathed position with the piercing end of said piercing means behind said face to an unsheathed position with the piercing end of said piercing means extended through said face; and
   (d) spring bias means for maintaining said piercing means in said sheathed position in the absence of said compressive force.

10. The device of claim 9 further comprising:
    (e) means for moving said piercing means from said sheathed position to the unsheathed position in response to a compressive force on said face.

11. A pressure actuated device for piercing an object comprising:
    (a) object receiving means having opposed faces for contacting said object;
    (b) means for moving at least one of said faces toward the other whereby a compressive force may be applied on said object between said faces;
    (c) piercing means movable through at least one of said faces from a sheathed position within the volume defined between said opposed faces;
    (d) compressive force responsive means for moving said piercing means relative to at least one of said faces, said means maintaining said piercing means in the sheathed position in the absence of said compressive force and in the unsheathed position in the presence of said compressive force.

12. The device of claim 11 further comprising piercing means and compressive force responsive means associated with each of said opposed faces.

13. The device of claim 11 wherein said compressive force responsive means comprises spring means biasing said piercing means i the sheathed position in the absence of said compressive force.

14. The device of claim 13 further comprising piercing means and compressive force responsive means associated with each of said opposed faces.

15. The device of claim 13 wherein said compressive force responsive means further comprises compressive force transmitting means operative, when said piercing means is in the unsheathed position, between said piercing means and said means for moving at least one of said faces.

16. A die member for use in a press for simultaneously compressing and piercing an object, said die member comprising:
   (a) a face portion for contacting the object to be pierced;
   (b) a shaft terminating at one end in said face portion;
   (c) an internal cavity within said shaft, said cavity extending through said face portion;
   (d) piercing means slidably received within said cavity and movable therein from a first position where said piercing means does not extend through said face portion to a second position where said piercing means extends through said face portion; and
   (e) bias means within said cavity for maintaining said piercing means in said first position in the absence of a compressive force on said face portion.

17. The die member of claim 16 wherein said bias means comprises spring means disposed between said piercing means and the interior of said shaft.

* * * * *